US005566070A

United States Patent [19]
Mack et al.

[11] Patent Number: 5,566,070
[45] Date of Patent: Oct. 15, 1996

[54] TRANSMISSION SHIFT CONTROL INCLUDING DEFLECTION-TYPE NEUTRAL SIGNAL ERROR DETECTION AND RESPONSE

[75] Inventors: William J. Mack, Clemmons, N.C.; Gregory J. Organek, Livonia; Daniel G. Smedley, Farmington Hills, both of Mich.

[73] Assignee: Eaton Corporation, Cleveland, Ohio

[21] Appl. No.: 382,706

[22] Filed: Feb. 2, 1995

[51] Int. Cl.$^6$ .................................................. B60K 41/00
[52] U.S. Cl. ........................... 364/424.1; 364/424.01; 364/424.03; 477/111; 477/75; 477/70; 477/906; 74/335; 74/336 R
[58] Field of Search ................... 364/424.1, 424.01, 364/424.03; 74/335, 336 R, 473 R, 475, 364, 365, 477; 477/125, 906, 123, 78, 70, 124, 129, 905, 73, 74, 75, 908; 475/223, 220, 269

[56] References Cited

U.S. PATENT DOCUMENTS

| Re. 34,260 | 5/1993 | Markyvech et al. | 74/335 |
|---|---|---|---|
| 4,361,060 | 11/1982 | Smyth | 477/78 |
| 4,648,290 | 8/1987 | Dunkley et al. | 477/78 |
| 4,702,127 | 10/1987 | Cote | 364/424.1 |
| 4,873,881 | 10/1989 | Edelen et al. | 74/336 R |
| 4,899,607 | 2/1990 | Stainton | 74/335 |
| 4,920,815 | 5/1990 | Reynolds | 74/335 |
| 4,945,484 | 7/1990 | Cote et al. | 364/424.1 |
| 5,042,327 | 8/1991 | Stainton | 477/73 |
| 5,053,959 | 10/1991 | Genise | 364/424.1 |
| 5,191,804 | 3/1993 | Genise | 74/335 |
| 5,222,404 | 6/1993 | Stine | 74/335 |
| 5,261,288 | 11/1993 | Menig | 74/335 |

Primary Examiner—Kevin J. Teska
Assistant Examiner—Jacques Louis-Jacques
Attorney, Agent, or Firm—Howard D. Gordon

[57] ABSTRACT

A control method/system for sensing deflection-type gear neutral signal (GNS) errors in an automated mechanical transmission system (10) is provided. A gear neutral sensor (76/76A) provides signals indicative of axial position in a remote shift shaft (56) from which the neutral and not-neutral positioning of associated jaw clutch members (144) is inferred. Deflections in the shift members, such as the shift yokes (50), may result in erroneous indications of a neutral condition, which is a deflection-type gear neutral signal error sensed by the control of the present invention.

10 Claims, 5 Drawing Sheets

TRANSMISSION SHIFT CONTROL INCLUDING DEFLECTION-TYPE NEUTRAL SIGNAL ERROR DETECTION AND RESPONSE

BACKGROUND OF THE INVENTION

1. Field of the Invention

This invention relates to fully and partially automated vehicular mechanical transmission systems of the type requiring sensing of transmission neutral conditions. In particular, the present invention relates to a control method/system for verifying a sensed transmission neutral condition in an at least partially automated mechanical transmission system.

2. Description of the Prior Art

Fully and partially automated mechanical transmission systems intended for vehicular use are well known in the prior art, as may be seen by reference to U.S. Pat. Nos. 4,361,060; 4,648,290; 4,595,986; 4,850,236; 5,053,959; 5,109,721; 5,261,288 and 5,315,218, the disclosures of which are incorporated herein by reference. In these types of systems, it is typically important to achieve and to sense transmission neutal conditions, such as, for example, when using engine fueling/braking control to achieve synchronous conditions for engaging a target gear ratio.

The prior art automated transmission systems typically utilized electric, electro-mechanical, electro-hydraulic or electro-pneumatic type actuators to operate a plurality of generally parallel shift rails or a single shift shaft mechanism, or the like, through an X–Y mechanism and/or a plurality of linear actuators. Shift mechanisms of this type may be seen by reference to U.S. Pat. Nos. 4,445,393; 4,873,881; 4,899,607; 4,920,815; RE 34,260; 4,945,484 and 5,000,060, the disclosures of which are incorporated herein by reference.

Axially movable jaw clutch members are selectively axially positioned by shift yokes (also called shift forks) carried by shift shafts or block mechanisms, which are axially positioned by shift fingers, pistons and the like. As it is difficult to provide sensors at the transmission jaw clutch mechanisms, jaw clutch position is typically inferred from sensors located in the actuators, which sense the position of shift shafts, shift fingers, actuator pistons and the like. As the forces required to move the jaw clutch members into and/or out of positive engagement may be considerable, such as, for example, when shifting to neutral under torque lock conditions, deflection of shift yokes and/or other members may cause the actual position of the monitored jaw clutch member to be different from that inferred by the sensor.

By way of example, it has been observed that under loaded conditions, a properly operating sensor in the actuator mechanism may indicate that a jaw clutch has disengaged while the jaw clutch is actually sufficiently positively engaged to allow the transmission to transfer torque from the vehicle engine to the vehicle drive wheels. This may result in a very disconcerting situation for the vehicle operator if torque is then applied to the transmission input shaft while attempting to synchronize by use of increased engine fueling, application of an engine brake or input shaft brake, etc.

Prior art controls have had fault-sensing/fault-tolerant logics wherein faulty neutral sensors were identified and fault-tolerant logic was adopted. See aforementioned U.S. Pat. No. 4,945,484; see also, U.S. Pat. No. 4,702,127, the disclosures of which are incorporated herein by reference.

The prior art control methods/systems were not totally satisfactory, as deflections and the like may cause incorrect inferences of clutch conditions, even with non-faulty sensor operation and/or relied on waiting for and/or causing a predetermined speed difference across the suspected disengaged jaw clutch, which may be time-consuming and which may not occur even if the jaw clutch is disengaged and/or may not distinguish between incorrect neutral position indications resulting from a faulty sensor condition and incorrect neutral positions resulting from a deflection condition.

SUMMARY OF THE INVENTION

In accordance with the present invention, the drawbacks of the prior art have been overcome or minimized by the provision of a control system/method for fully or partially automated mechanical transmission systems which will verify an indicated transmission neutral condition and/or will indicate that, due to deflection conditions, the indicated neutral condition may be inaccurate. A gear neutral condition signal from a transmission neutral position sensor is considered to be inaccurate if the value thereof (GN=true; GN=false) is not indicative of the true engaged or disengaged condition of the transmission or transmission section monitored thereby.

According to the present invention, neutral in the transmission or transmission section may be verified by relieving the force on the shift actuator once a neutral position is sensed at the actuator. If the position of the actuator remains unchanged when the shift yoke is unloaded, then the transmission is truly in neutral and no further action is required. However, if the shift actuator springs out of the neutral band, then it may be assumed that the transmission is still in gear. The system will then take additional action to bring the transmission to neutral, such as manipulation of the engine torque to cause a zero torque transition and/or disengagement of the master clutch while again applying the neutral force to the actuator.

The control system/method of the present invention, thus, detects a false transmission neutral indication for at least partially automated mechanical transmissions utilizing a properly operating neutral sensor located in the transmission actuator which is resulting from deflections in the transmission shifting mechanism members, such as the transmission shift yoke or the like. These types of false indications are referred to as "deflection-type neutral signal errors."

Accordingly, it is an object of the present invention to provide a new and improved control method/system for at least partially automated mechanical transmission systems, which senses faulty gear neutral indications resulting from deflection of transmission actuator members.

This and other objects and advantages of the present invention will become apparent from a reading of the detailed description of the preferred embodiment taken in connection with the attached drawings.

DESCRIPTION OF THE PREFERRED EMBODIMENT

Figure 1:
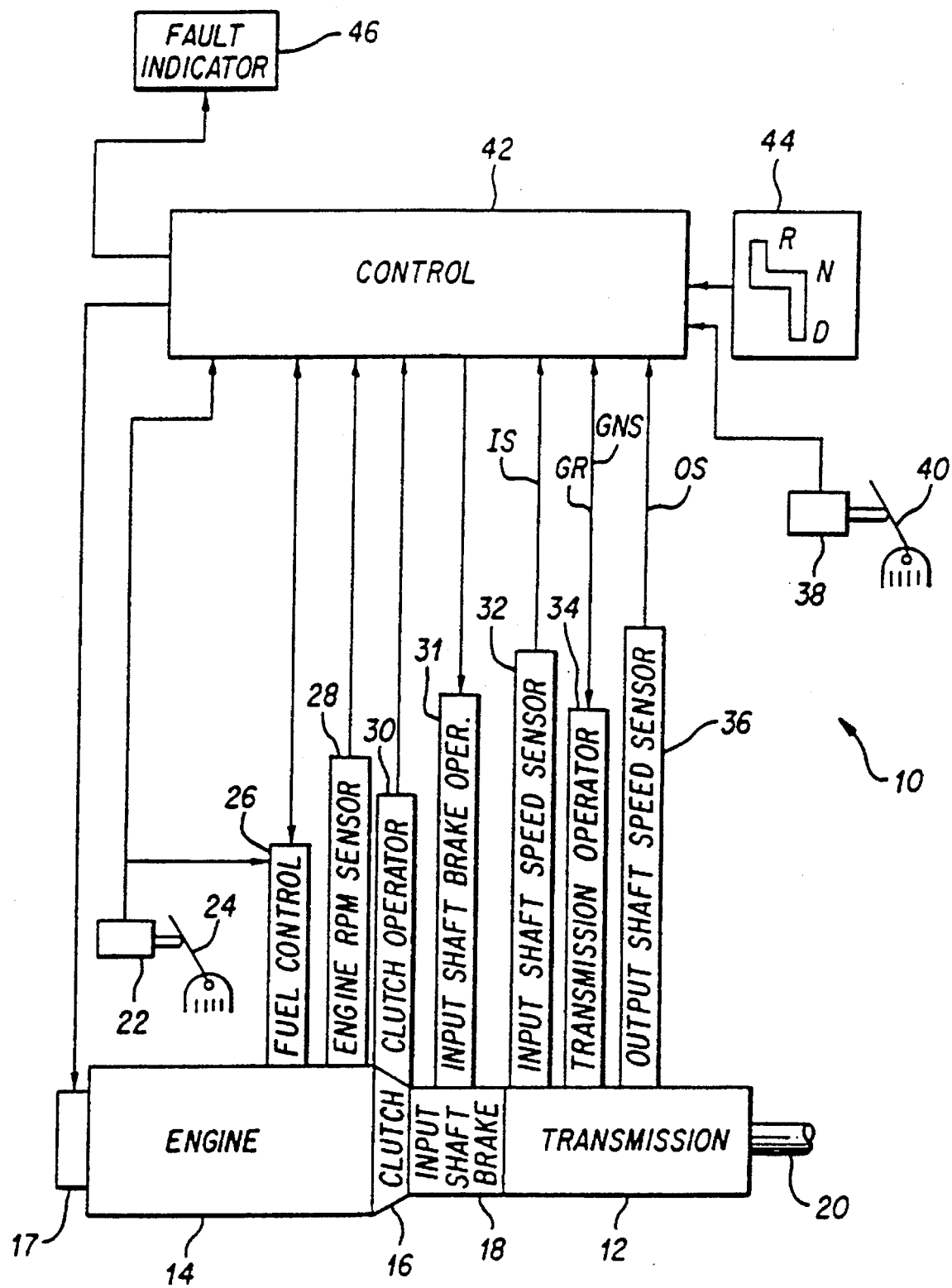
FIG. 1 is a schematic illustration of one example of an automated mechanical transmission system advantageously utilizing the neutral verification control system/method of the present invention.

FIG. 1 schematically illustrates an automatic mechanical transmission system 10 including an automatic multiple-speed change-gear transmission 12 driven by a throttle-controlled engine 14, such as a well-known diesel engine, through a master clutch 16. An engine brake, such as an exhaust brake 17 for retarding the rotational speed of engine 14 and/or an output shaft brake 18 which is effective to apply a retarding force to the input shaft of the transmission upon disengagement of the master clutch 16, may be provided, as is also well known in the prior art. The output of automatic transmission 12 is output shaft 20, which is adapted for driving connection with an appropriate vehicle component, such as the differential of a drive axle, a transfer case or the like.

The aforementioned powertrain components are acted upon and/or monitored by several devices, each of which will be discussed in greater detail below. These devices include a throttle position or throttle opening monitor assembly 22, which senses the position of the operator-controlled vehicle throttle and/or other fuel throttling device 24, a fuel-control device 26 for controlling the amount of fuel to be supplied to engine 14, an engine speed sensor 28 which senses the rotational speed of the engine, a master clutch operator 30 which engages and disengages master clutch 16 and which also supplies information as to the status of the master clutch, an input brake operator 31, a transmission input shaft speed sensor 32, a transmission operator 34 which is effective to shift the transmission 12 into a selected gear ratio and to provide a signal or signals indicative of the gear neutral condition and/or currently engaged ratio, and a transmission output shaft speed sensor 36. A vehicle brake monitor 38 senses actuation of the vehicle brake pedal 40.

A transmission operator for an automated mechanical transmission system including a gear neutral switch may be seen by reference to aforementioned U.S. Pat. Nos. 4,945,484 and 4,445,393, the disclosures of which are incorporated herein by reference. The aforementioned devices supply information to and/or accept commands from a central processing unit or control 42. The central processing unit 42 may include analog and/or digital electronic calculation and logic circuitry, the specific configuration and structure of which forms no part of the present invention. Central processing unit 42 may be of the type illustrated in aforementioned U.S. Pat. No. 4,595,986. The central processing unit 42 also receives information from a shift control assembly 44 by which the vehicle operator may select a reverse (R), neutral (N) or forward drive (D) mode of operation of the vehicle. An electrical power source (not shown) and/or a source of pressurized fluid (not shown) provides electrical, hydraulic and/or pneumatic power to the various sensing, operating and/or processing units. A fault indicator or alarm 46 may display the identity of a specific fault or simply the existence of an unidentified fault.

Sensors 22, 28, 32, 36, 38 and 44 may be of any known type or construction for generating analog or digital signals proportional to the parameter monitored thereby. Similarly, operators 17, 18, 26, 30 and 34 may be of any known electrical, pneumatic, hydraulic or electro-pneumatic or -hydraulic type for executing operations in response to command output signals from processing unit 42 and/or for providing input signals thereto. Fuel control 26 normally will supply fuel to engine 14 in accordance with the operator's setting of throttle 24, but may supply a lesser (fuel dip) or greater (fuel boost) amount of fuel in accordance with commands from control unit 42. Fuel control 26 may include an electronically controlled engine and an electronic data link of the type conforming to ISO 11898, SAE J1922 and/or SAE J1939 or similar protocols.

Figure 2:
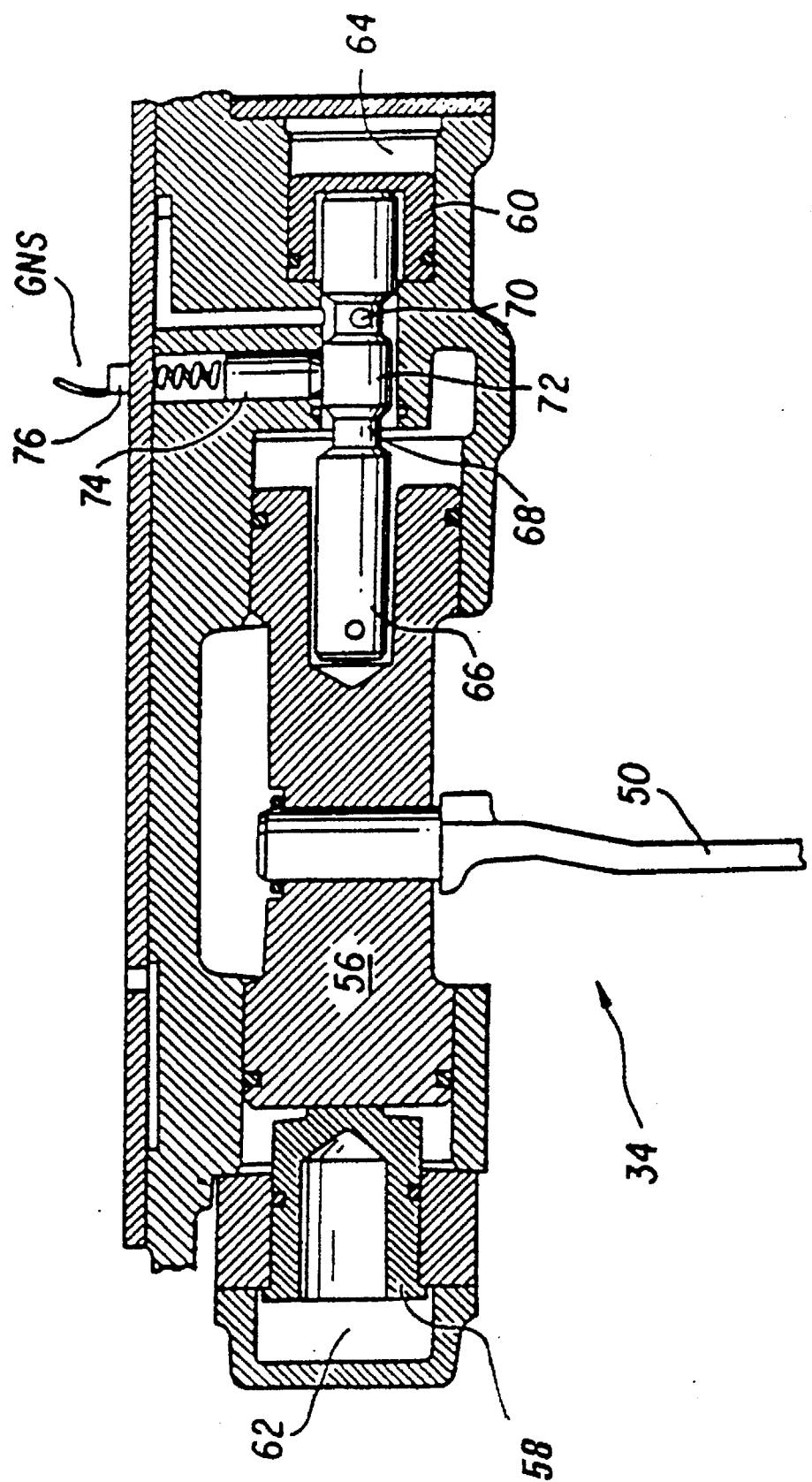
FIG. 2 is a partial sectional view of one example of a transmission actuator, including a gear neutral sensor switch.

A portion of a typical transmission operator 34, for purposes of example only, may be seen by reference to FIG. 2. Briefly, a shift fork 50 is carried by a shift rail 56 for axial movement therewith. A pair of opposed fluid-actuated pistons, 58 and 60, are slidably and sealingly received in selectively pressurized cylinders, 62 and 64, respectively. A shift rod member 66 is axially movable with shift rod 56 and shift fork 50 and defines a pair of grooves, 68 and 70, which are separated by a land 72. A spring-biased plunger 74 cooperates with the land 72 to open gear neutral switch 76 and with grooves 68 and 70 to close gear neutral switch 76. The gear neutral switch 76, thus, provides a gear neutral signal (GNS) having a first value (GNS=0) to indicate a gear neutral condition and a second value (GNS=1) to indicate a non-gear neutral condition.

Figure 2A:
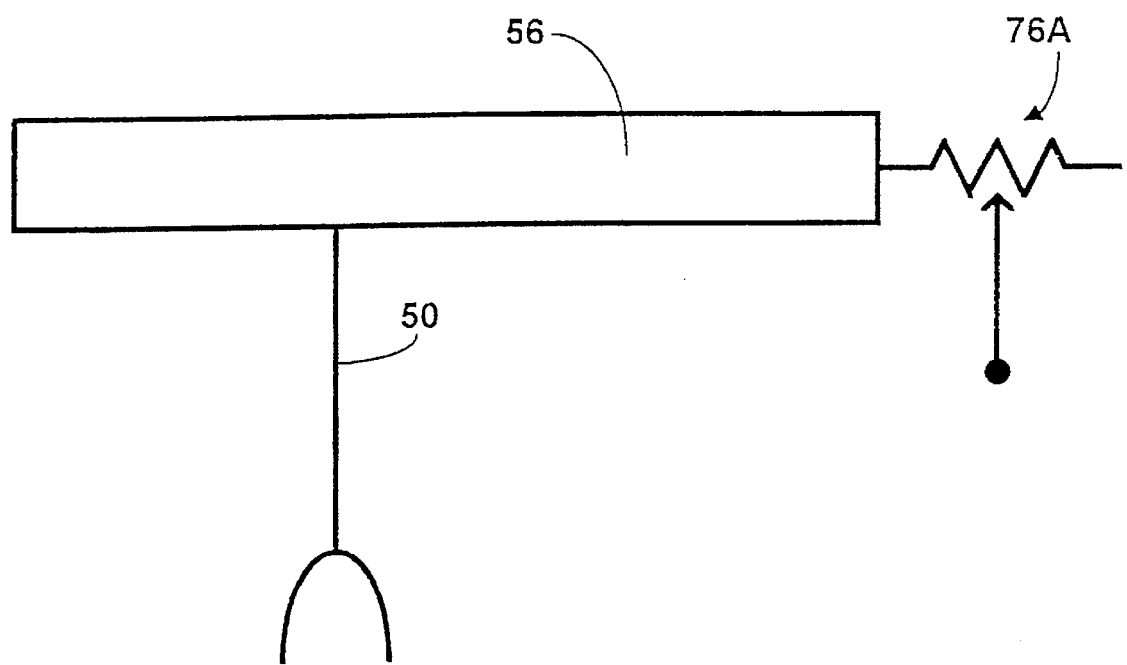
FIG. 2A is a schematic view of an alternate gear neutral sensor.

FIG. 2A illustrates a linear position sensor, such as linear potentiometer 76A, for sensing the axial position of shaft 56 and shift fork 50. Of course, other types of position sensors, such as hall-effect devices and the like, may be utilized to sense the axial position of the actuator.

The gear neutral sensor input signal (GNS) is utilized by the central processing unit 42 to control shifting of the automated mechanical transmission 12. For example, during a shift sequence, when the transmission is being shifted from a previously engaged ratio into a target gear ratio, if the gear neutral signal indicates a gear neutral condition exists, the synchronization procedure for engaging the target gear ratio may proceed. Also, after synchronization has occurred and the transmission 12 is being shifted into the target gear ratio, if the GNS signal indicates that a non-gear neutral condition exists, the transmission is considered engaged, or at least partially engaged, and the master clutch 16 may be reengaged.

It is important that the inputs (GNS=0 or GNS=1) provided by sensor 76 be verified to determine that deflection of the various shift mechanisms have not caused the signal to be inaccurate. Further, proper operation of the sensor 76 per se may be periodically tested, as indicated in aforementioned U.S. Pat. No. 4,945,484.

Figure 4:
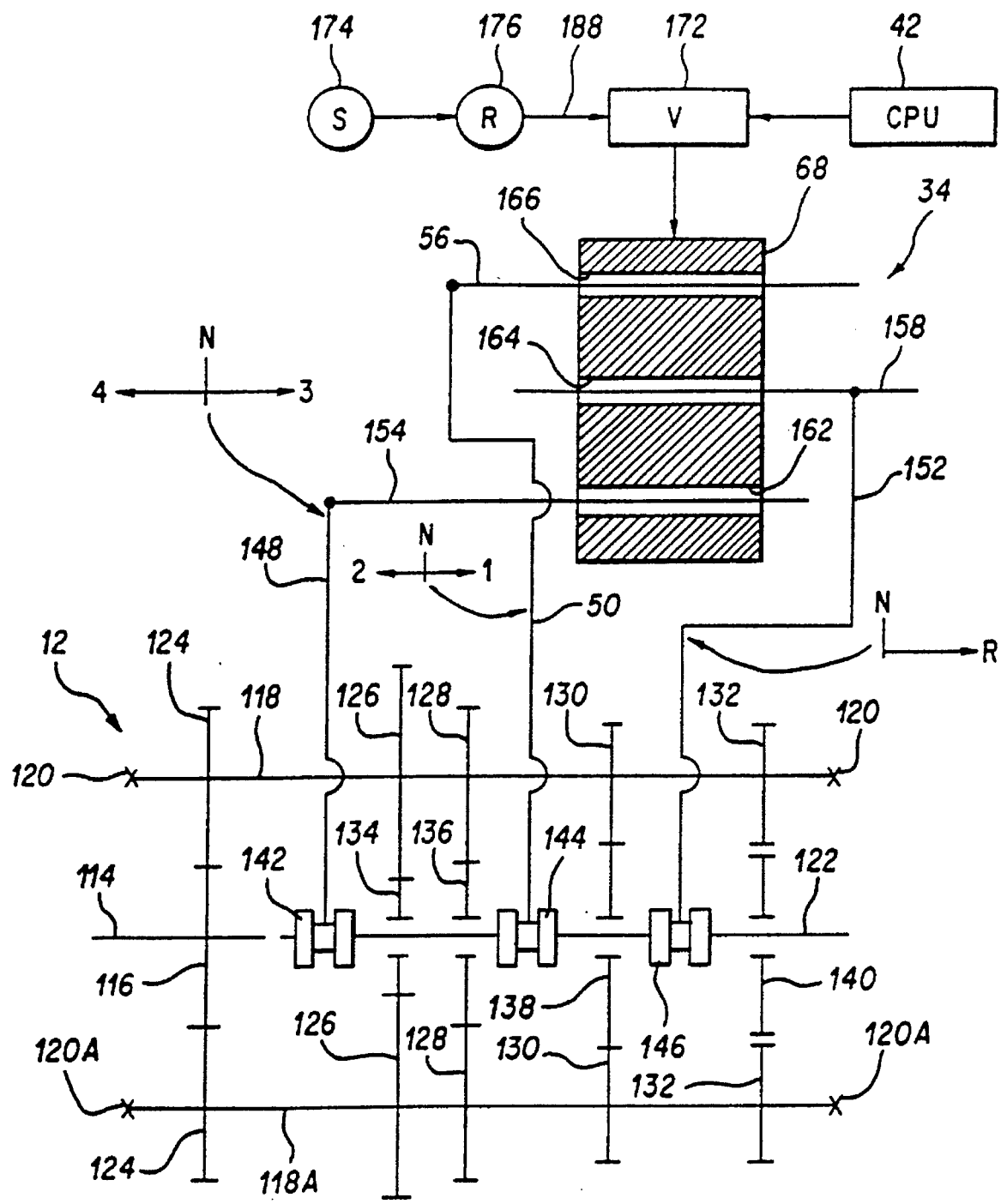
FIG. 4 is a schematic illustration of one example of a simple mechanical change-gear transmission, or a main section of a compound mechanical change-gear transmission, of the type controlled by the present invention.

A typical 4-forward-speed, single reverse speed, change-gear mechanical transmission or transmission section 12 for use with system 10 is schematically illustrated in FIG. 4. Transmission 12 is a simple transmission, or transmission section, of the twin countershaft type, which is well known in the prior art, and which may be understood in greater detail by reference to U.S. Pat. Nos. 3,105,395; 4,735,109 and 4,152,949, the disclosures of which are incorporated herein by reference.

The illustrated transmission comprises an input shaft 114 carrying an input gear 116 for rotation therewith. Input shaft 114 is intended to be driven by prime mover 14 through a master friction clutch or torque converter, as is well known in the art. A pair of substantially identical countershafts, 118 and 118A, are rotatably mounted in a housing (not shown) by means of bearings, 120 and 120A. A main or output shaft 22 is provided, which is preferably floatingly and/or pivotably mounted in the transmission housing.

Each of the countershafts 120 and 120A carries countershaft gears 124, 126, 128, 130 and 132 fixed thereto for rotation therewith. Countershaft gear 124 is constantly meshed with input gear 116. A third-speed mainshaft gear 134 surrounds mainshaft 122 and is constantly meshed with and supported by the countershaft gears 126. Second-speed mainshaft gear 136 surrounds mainshaft 122 and is constantly meshed with and supported by countershaft gears 128. First-speed mainshaft gear 138 surrounds mainshaft 122 and is constantly meshed with and supported by countershaft gears 130. The reverse mainshaft gear 140 surrounds mainshaft 122 and is constantly meshed with and supported by a pair of idler gears (not shown) which, in turn, are constantly meshed with and driven by countershaft gears 132.

Axially slidable clutches 142, 144 and 146 are mounted, preferably by a spline connection, to mainshaft 122 for sliding movement relative thereto and for rotation therewith. A shift fork or yoke 148 is received in a groove in clutch 142 for controlling the axial position of clutch 142 relative to mainshaft 122. A shift fork 50 is received in a groove in clutch 144 for axially controlling the position of clutch 144 relative to mainshaft 122. A shift fork 152 is received in an axial groove in clutch 146 for controlling the axial position of clutch 146 relative to mainshaft 122.

The transmission actuator 34 includes three axially movable shift bars, also called shift rails or shift rods, 154, 56 and 158, which are substantially parallel and independently axially slidable in substantially parallel bores 162, 164 and 166, respectively, in a shift bar housing 34A. Shift bar housing 34A is typically mountable to the transmission housing (not shown) in a conventional manner. Shift fork 148 is axially movable with shift bar 154, shift fork 50 is axially movable with shift bar 56, and shift fork 152 is axially movable with shift bar 158. Of course, various other types of shift actuators may be utilized, such as X–Y shift mechanisms as disclosed in aforementioned U.S. Pat. Nos. 4,873,881; 4,899,607 and/or RE 34,260 and/or single shaft-type shifting mechanisms as disclosed in aforementioned U.S. Pat. No. 4,920,815.

Central processing unit 42 will provide control signals indicative of the desired target gear ratio to a valve assembly 172, which will typically comprise a plurality of individually controllable valves, such as solenoid valves or the like. Valve assembly 172 is fluidly connected to a source of pressurized fluid, such as hydraulic fluid or compressed air, from a source 174, which is preferably regulated by a regulator valve 176.

Transmission 12 is illustrated as utilizing positive, non-synchronized jaw clutches. Of course, friction clutches, synchronized positive clutches and/or blocked clutches, as are more fully described in U.S. Pat. No. 4,194,410, the disclosure of which is incorporated herein by reference, may be utilized. As only one of the clutches should be engaged at any one time to avoid damage to the transmission, shift bar housing assembly 34 will typically include an interlock mechanism (not shown) to prevent movement of more than one of the shift bars 154, 156 and 158 from the neutral axial positions thereof at a given time.

The present invention detects false transmission neutral (GNS=0) indications for automated mechanical transmissions that utilize a sensor, such as sensor 76, to indicate that the transmission is in a neutral state, of the type caused by deflections of shifting mechanisms such as shift forks. Such false transmission neutral indication may readily occur due to deflections of the shift mechanism's mechanical members, which may occur when the jaw clutch members are under a torque lock condition and are loaded to move in the neutral position by one of the acuator pistons, such as piston 58 or 60.

Figure 3:
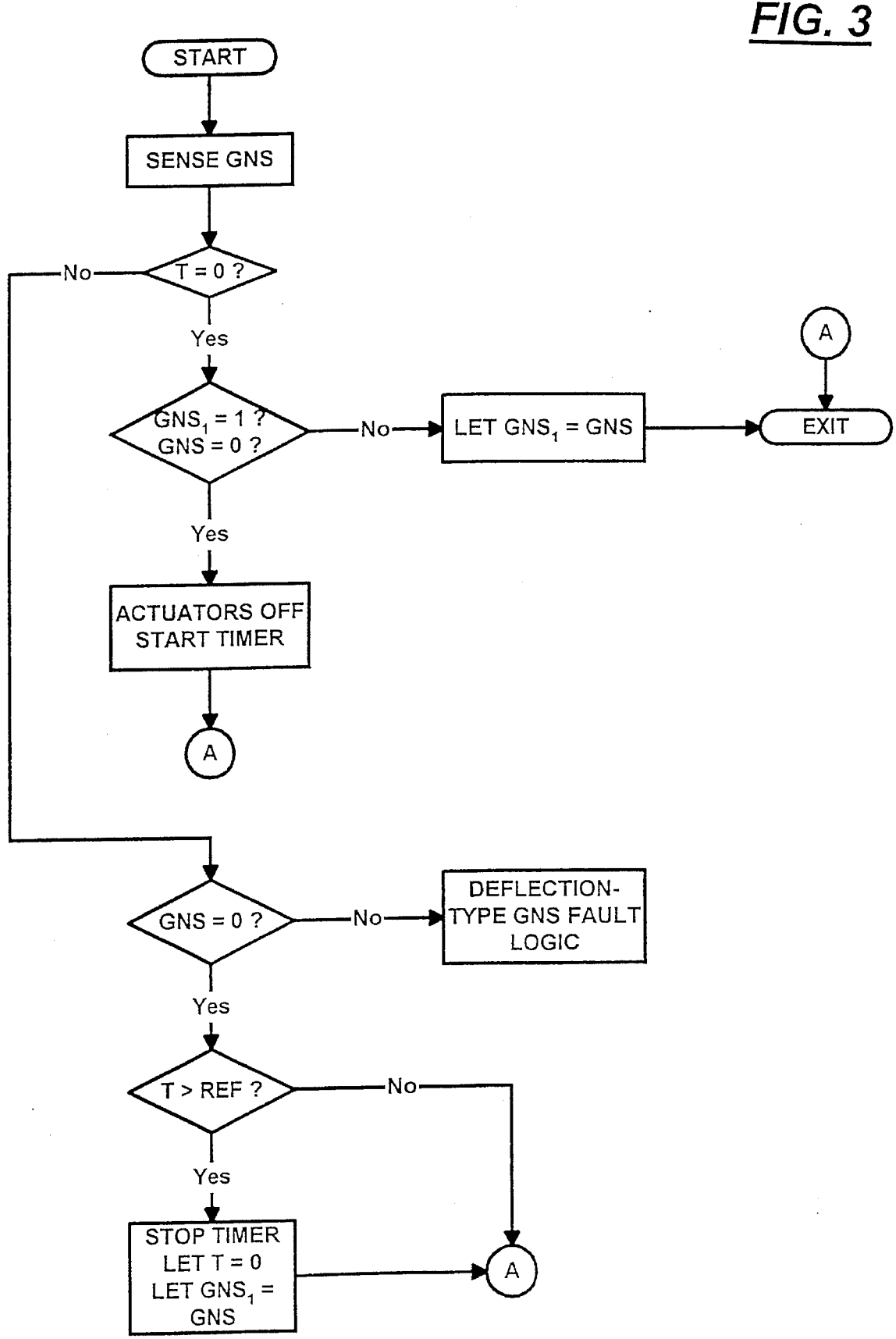
FIG. 3 is a schematic illustration, in flow chart format, of the control system/method of the present invention.

According to the control system/method of the present invention, as is schematically illustrated in flow chart format in FIG. 3, the presence or absence of a deflection-type fault in the gear neutral signal (i.e., GNS=0) when the transmission is not actually in neutral due to a deflection rather than a faulty sensor or the like, may be sensed by relieving the force of the shift actuator once neutral is initially sensed at the actuator. After turning off the actuator, if the axial position of the actuator remains substantially unchanged when the shift yoke is unloaded, then the transmission is truly in neutral and no further action is required. However, if the actuator springs out of the neutral band, then it may be assumed that the transmission is still engaged and not in neutral. The system will then take additional action to bring the transmission to neutral, such as manipulation of the engine torque to cause a zero torque condition (i.e., relieve a torque lock condition) and/or to disengage the main clutch, also to cause a zero torque or to relieve a torque lock condition. These actions are referred to as deflection-type GNS fault logics on the flow chart of FIG. 3. If no deflection-type fault in the GNS signal is sensed, the subroutine is exited and the transmission is controlled according to other logic routines therefor, which may include other GNS fault-sensing routines such as is described in aforementioned U.S. Pat. No. 4,945,484.

Relieving the forces tending to move the shift actuator into its axial position corresponding to neutral has a further advantage in a multiple-shift-rail system. Misalignments and the like may cause minor obstructions to the movement of a shift finger in the selection direction. Relieving forces on the shift actuator once neutral is sensed allows the shift finger to more easily overcome such obstructions.

Although the present invention has been set forth with a certain degree of particularity, it is understood that various modifications are possible without departing from the spirit and the scope of the invention as hereinafter claimed.

We claim:

1. A method for controlling transmission shifting in an at least partially automated vehicular mechanical transmission system (10) comprising a multiple-speed change-gear transmission (12) having a positive clutch member (142, 144, 146) selectively axially positioned to an engaged position and to a non-engaged neutral position by a remote shift actuator (158, 154, 56) having axial positions corresponding to the engaged and non-engaged neutral positions of the clutch member, said actuator including force application means (56, 60) for urging said actuator to a selected axial position thereof, a neutral position sensor (76/76A) located at said actuator for providing a neutral signal having a first value indicating that said shift actuator is in an axial position corresponding to the non-engaged neutral position of said clutch member and a second value indicating that said shift actuator is in an axial position not corresponding to the non-engaged neutral position of said clutch member, and an information processing unit (42) for receiving a plurality of input signals including said neutral signal (GNS) and for processing same according to predetermined logic rules to issue command output signals to system actuators including said shift actuator, said method comprising:

during a shift into transmission neutral, upon sensing a change in said neutral signal value from said second to said first value, causing said force application means to cease applying an axial force to said shift actuator, if said neutral signal remains at said first value for a predetermined period of time (T>REF), determining that a deflection-type neutral signal error does not exist and, if said neutral signal changes from said first to said second value prior to expiration of said predetermined period of time, determining that a deflection-type neutral signal error exists; and controlling shifting as a function of determined existing and non-existing deflection-type neutral signal errors.

2. The method of claim 1 wherein said controlling shifting comprises, upon determining that a deflection-type neutral signal error exists, causing said force-applying means to urge said actuator toward the axial position thereof corresponding to the non-engaged neutral position of said clutch while causing other system actuators to take actions tending to minimize or reverse torque transfer at said clutch member.

3. The method of claim 1 wherein said shift actuator is an axially movable shaft (50) having an associated recess and land structure (68, 70, 72) and said neutral position sensor includes a plunger (74) interacting with said recess and land structure.

4. The method of claim 1 wherein said shift actuator is an axially movable shaft and said neutral position sensor is a linear position sensor (76A).

5. A machine for controlling transmission shifting in an at least partially automated vehicular mechanical transmission system (10) comprising a multiple-speed change-gear transmission (12) having a positive clutch member (142, 144, 146) selectively axially positioned to an engaged position and to a non-engaged neutral position by a remote shift actuator (158, 154, 56) having axial positions corresponding to the engaged and non-engaged neutral positions of the clutch member, said actuator including force application means (56, 60) for urging said actuator to a selected axial position thereof, a neutral position sensor (76/76A) located at said actuator for providing a neutral signal having a first value indicating that said shift actuator is in an axial position corresponding to the non-engaged neutral position of said clutch member and a second value indicating that said shift actuator is in an axial position not corresponding to the non-engaged neutral position of said clutch member, said machine including an information processing unit (42) for receiving a plurality of input signals including said neutral signal (GNS) and for processing same according to predetermined logic rules to issue command output signals to system actuators including said shift actuator, said information processing unit including logic rules effective, during a shift into transmission neutral, (i) upon initially sensing a change in said neutral signal value from said second to said first value, for causing said force application means to cease applying an axial force to said shift actuator, (ii) if said signal remains at said value for a predetermined period of time (T>REF), for determining that a deflection-type neutral signal error does not exist and, if said signal changes from said first to said second value prior to expiration of said predetermined period of time, for determining that a deflection-type neutral signal error exists; and (iii) for controlling shifting as a function of determined existing and non-existing deflection-type neutral signal errors.

6. The machine of claim 5 wherein said information processing unit logic rules for controlling shifting include logic rules effective, upon determining that a deflection-type neutral signal error exists, for causing said force-applying means to urge said actuator toward the axial position thereof corresponding to the non-engaged neutral position of said clutch while causing other system actuators to take actions tending to minimize or reverse torque transfer at said clutch member.

7. The machine of claim 5 wherein said shift actuator is an axially movable shaft (50) having an associated recess and land structure (68, 70, 72) and said neutral sensor includes a plunger (74) interacting with said recess and land structure.

8. The machine of claim 5 wherein said shift actuator is an axially movable shaft and said neutral position sensor is a linear position sensor (76A).

9. A method for controlling shifting in an at least partially automated vehicular mechanical transmission system (10) comprising a multiple-speed change-gear transmission (12) having a positive clutch member (142, 144, 146) selectively axially positioned to an engaged position and to a non-engaged neutral position by a remote shift actuator (158, 154, 56) having actuator positions corresponding to the engaged and non-engaged neutral positions of the clutch member, said actuator including force application means (56, 60) for urging said actuator to a selected actuator position thereof, a neutral position sensor (76/76A) located at said actuator for providing a neutral signal having a first value indicating that said shift actuator is in an actuator position corresponding to the non-engaged neutral position of said clutch member and a second value indicating that said shift actuator is in an actuator position not corresponding to the non-engaged neutral position of said clutch member, and an information processing unit (42) for receiving a plurality of input signals including said neutral signal (GNS) and for processing same according to predetermined logic rules to issue command output signals to system actuators including said shift actuator, said method comprising:

during a shift into transmission neutral, upon sensing a change in said neutral signal value from said second to said first value, causing said force application means to cease applying an axial force to said shift actuator;

if said neutral signal remains at said first value for a predetermined period of time (T>REF), determining that a deflection-type neutral signal error does not exist and, if said netrual signal changes from said first to said second value prior to expiration of said predetermined period of time, determining that a deflection-type neutral signal error exsits; and controlling said shift actuator as a function of determined existing and non-existing deflection-type shift errors.

10. The method of claim 9 wherein said controlling shifting comprises, upon determining that a deflection-type neutral signal error exists, causing said force-applying means to urge said actuator toward the actuator position thereof corresponding to the non-engaged neutral position of said clutch while causing other system actuators to take actions tending to minimize or reverse torque transfer at said clutch member.

* * * * *